United States Patent Office 2,840,350
Patented June 24, 1958

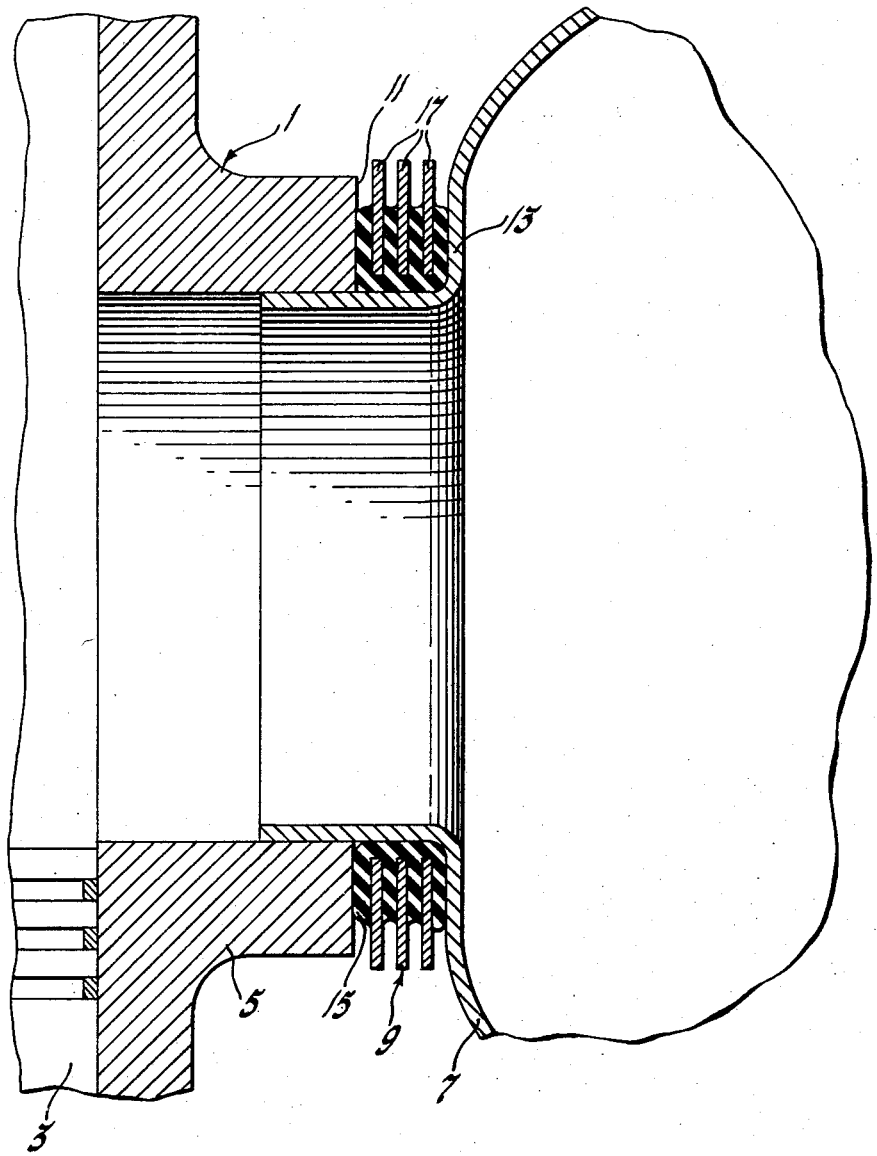

2,840,350

HIGH TEMPERATURE SEALS

Earl R. Pierce, Birmingham, Mich., assignor to General Motors Corporation, Detroit, Mich., a corporation of Delaware Application June 10, 1955, Serial No. 514,466

3 Claims. (Cl. 257—1)

This invention relates to high temperature seals and more particularly to an air-cooled resilient seal which is adapted for use in forming a sealed connection between members operating under high temperature conditions.

There are numerous applications known today where the availability of a resilient sealing gasket adapted to take up and compensate for small movements due to thermal changes, vibrations and torque reaction deflections, while at the same time being capable of functioning at high temperatures in the order of from about 500° F. to 1000° F. and over, would considerably reduce the problems of design and expense. Typical of such applications is that of sealing hot gas conductors or receivers in engines and gas turbines where requirements of weight, space and structural design permit only a minimum of constraint between the gas conductor or receiver and the structure to which it is connected.

The interconnection of the exhaust ports with an exhaust receiver such as an exhaust manifold or a turbine nozzle box has always been a difficult item of design where, as is usually the case with air-cooled engines, the cylinders are not en-block with the crankcase. Long branches have been used to obtain resilience, but such design requires an excess of space frequently unavailable. Likewise, bellows have been used but such an expedient is objectionable since they are both bulky and expensive, the bellows generally having but a short fatigue life and being made of a stainless material, i. e., stainless steel, to prevent corrosion.

Accordingly, it is an object of my invention to provide an inexpensive resilient sealing member capable of operating at high temperature levels. It is a further object of my invention to provide a seal for a hot gas conductor or receiver which seal is adapted to compensate for changes in length and position due to thermal expansion and contraction and vibrations encountered under normal operating conditions. It is another object of my invention to provide a high temperature seal between the exhaust port of a hot gas generator and a gas receiver. It is a still further object of my invention to provide a method for fabricating a high temperature resilient seal.

These and other objects of my invention are attained by providing a sealing member formed of a high temperature plastic material having at least one heat conducting cooling fin imbedded therein and extending therefrom.

For a better understanding of my invention reference may be had to the accompanying drawing showing the sealing member of my invention as used to make a waterproof, high temperature, resilient interconnection between the exhaust port of an air-cooled engine and the exhaust manifold.

Having reference now to the drawing, there is shown a cylinder 1 of an air-cooled engine having a piston 3 and an exhaust port 5 so positioned as to vent the products of combustion from the cylinder at the end portion of the downstroke. An exhaust receiver or manifold 7 is shown as being sleeved within the exhaust port 5, the sealing ring 9 of my invention being shown as interposed between the upper surface 11 of the exhaust port and a flange-like portion 13 of the exhaust receiver 7. The exhaust receiver 7 is assembled with the engine in such manner as to urge the receiver towards the cylinder 1. Any convenient and well-known means such as a tensioning bolt or clamping band, which means is not shown and forms no part of my invention, may be used to make this assembly.

It is quite apparent from the drawing that the sealing ring 9 is compressed between the exhaust port 5 and the receiver 7 and is subjected to the high temperature of the exhaust gases. While plastic materials having thermal stability at high temperatures are known, such materials are limited as to their use in high temperature sealing applications since they are suitable for use up to temperatures of only about 500° F. Inasmuch as the combustion gases from a diesel engine exhaust at a temperature as high as 800° F. and since, with the trend toward gas turbine engines, exhaust temperatures of a 1000° F. and higher may be anticipated, it becomes necessary to provide a seal which would not only be resilient and resistant to both vibration and corrosion but would also be capable of operating at these higher temperatures.

The seal of my invention is specifically designed to function under the extreme conditions of vibration and temperature described. As is clearly shown on the drawing, the seal 9 comprises a resilient plastic body 15 having the form of an annular ring in which a plurality of cooling fins 17 are imbedded, their outer ends extending beyond the outer surface of the ring 15. The resilient body 15 may be formed of any suitable plastic material having high temperature stability. Such materials as the silicone polymers made by combining silicon dioxide with methyl or ethyl groups, i. e., the dimethyl polymer known as Silicone Rubber, and the organic fluorides such as Teflon, a tetrafluoroethylene polymer, or Kel-F, a trifluorochloroethylene polymer, may be used. The cooling fins 17 may be formed of any suitable metal such as aluminum having high heat conducting properties and serve to extract heat from the body of the seal 9 thus making it possible for the ring to be utilized in applications where the temperatures to which it would be subjected are higher than about 500° F. It is quite apparent from my description that the sealing member 9 of my invention is readily adaptable to enumerable specific applications, the application to an air-cooled engine as shown on the drawing being merely for purposes of illustration. The resilient characteristics of the member 9 may be controlled by varying the thickness of the body portion 15. It is to be understood at this point that the body portion 15 is of such thickness as to be distinguished from a conventional sealing gasket which is normally in the order of $\frac{1}{16}''$ in thickness. Likewise, the temperature to which the member 9 may be applied may be controlled by varying the size and number of heat conducting fins 17 imbedded within the seal member 9 along with controlling the temperature of cooling air or other cooling medium passing over the cooling fins.

A preferred method for forming the sealing member of my invention is that of forming a composite laminate by stacking up in alternate layers rings of plastic material and metal cooling fins, the inner portions of the cooling fins overlapping the outer portions of the plastic rings and extending beyond their outer edge in the manner shown on the drawing. The plastic rings may be cemented to each other and to the fins by means of any thermally stable cement such as the silicone or fluoride polymers described above, or they may preferably be heated in a mold to cure the stack and form an integral unit of the alternate layers of material. Likewise, the fins may be set up in a mold and the polymer material may be cast around them.

It is apparent from the above description that I have provided a resilient sealing member which is adapted for use in applications where conditions of temperature and vibration make the conventional expedients for sealing high temperature fluid conductors undesirable because of the expense and design difficulties involved.

While I have described and illustrated but a single and preferred form of my invention, it is to be understood that this embodiment is illustrative only, and that other embodiments as come within the claims which follow are within the full and intended scope of my invention.

I claim:

1. In a device of the type described, the combination comprising a first hot fluid conductor, a second hot fluid conductor interconnected with said first conductor, a resiliently compressible body member positioned between said first and second conductors to seal said interconnection and cooling means imbedded in said body member and having a portion extending therefrom to extract heat from said body member.

2. In a device of the type disclosed, the combination comprising a pair of interconnected hot fluid conductors, a resiliently compressible plastic body member compressed between said conductors to seal the interconnection, and at least one cooling fin imbedded in said body member and having a portion thereof extending therefrom to extract heat from and cool said body member.

3. In a sealing device, the combination comprising an exhaust port, an exhaust receiver interconnected with said port, a resilient, thermally stable, plastic sealing ring compressed between said port and said receiver to seal said interconnection, a plurality of metal cooling fins imbedded in said ring, and a portion of each fin extending beyond the outer edge of said ring to radiate heat from and cool said ring, said cooling fins having intimate contact with said ring over a relatively large surface area for efficient heat conduction therebetween.

References Cited in the file of this patent

UNITED STATES PATENTS 2,641,024   Panagrossi _____ June 9, 1953

FOREIGN PATENTS 25,323 of 1898   Great Britain _____ Nov. 30, 1898